J. T. ELLSWORTH.
PROCESS OF RECOVERING ZINC FROM COMPLEX ORES.
APPLICATION FILED JULY 12, 1921.
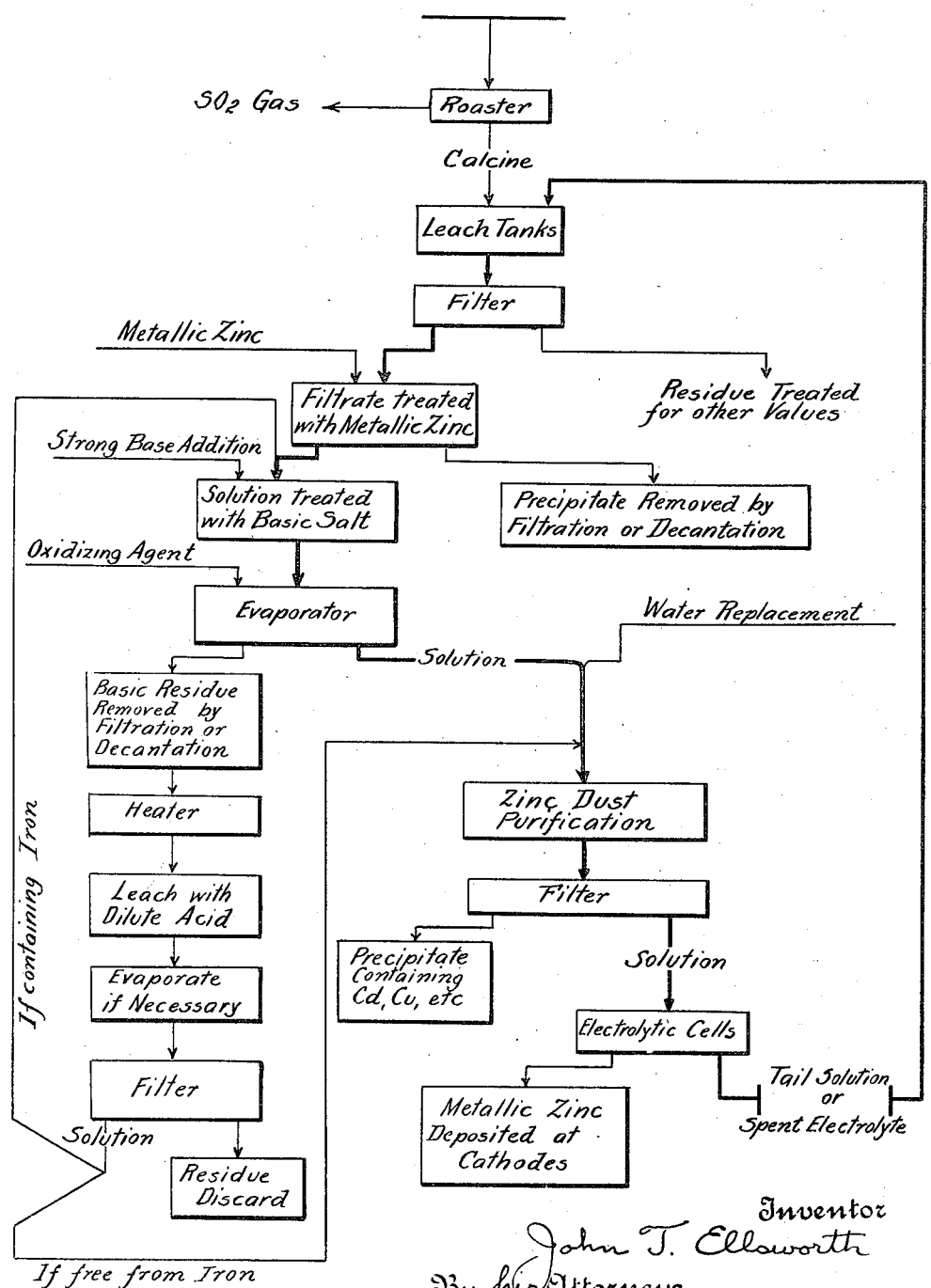

Patented Sept. 19, 1922.

1,429,330

UNITED STATES PATENT OFFICE.

JOHN THAYER ELLSWORTH, OF PARK CITY, UTAH.

PROCESS OF RECOVERING ZINC FROM COMPLEX ORES.

Application filed July 12, 1921. Serial No. 484,195.

*To all whom it may concern:*

Be it known that I, JOHN T. ELLSWORTH, a citizen of the United States, residing at Park City, in the county of Summit, State of Utah, have invented certain new and useful Improvements in Processes of Recovering Zinc from Complex Ores; and I do hereby declare the following to be a full, clear, and exact description of the invention, such as will enable others skilled in the art to which it appertains to make and use the same.

This invention relates to the treatment of zinciferous materials, such as zinc ores, concentrates, and the like, for the recovery of zinc therefrom by electrolysis, and has for its object the provision of certain improvements in the electrolytic method of recovering zinc from such materials.

In the treatment of zinciferous materials for recovering zinc therefrom by electrolysis, the zinc ore, concentrate or other zinciferous material, if not already in an oxidized condition, is roasted in order to convert the zinc compounds thereof into a readily soluble form, and the roasted material is treated with an appropriate solvent for dissolving the zinc content thereof. The spent electrolyte or tail solution of the electrolytic cells is usually employed as the solvent and is circulated in a cyclic manner through the solution or leaching apparatus, purifying apparatus and the electrolytic cells. The zinciferous material usually contains various other metallic substances which are dissolved along with the zinc, such for example as iron, copper, cadmium etc. The presence of these metallic substances in the electrolyte during the electrodeposition of the zinc gives rise to certain well recognized difficulties and objections, and it is customary to subject the zinc containing solution prior to its electrolysis to various treatments for removing impurities (that is, compounds other than zinc) therefrom.

The heretofore proposed procedures for removing impurities from the zinc containing electrolyte are defective in that they embody no provision for the elimination from the electrolyte of certain soluble salts which are not removed from the cyclic solution by any definite chemical or electro-chemical reaction to which the solution is normally subjected, but which, on the contrary, are thrown out of the solution by coming to a point of supersaturation, where, by starting to crystallize, they carry out a considerable amount of zinc as sulfate, which in the heretofore customary electrolytic zinc processes results in considerable loss of zinc as well as in difficulty in operation at various points in the cycle. The present invention contemplates the removal from the solution prior to electrolysis of a certain amount of such soluble salts in such a manner as to inhibit the precipitation at any subsequent stage in the process of any such soluble salts as a result of the supersaturation of the solution therewith. Thus, the present invention, in its preferred form, involves removing such soluble salts from the solution by evaporating the solution and thereby increasing the concentration of the soluble salts therein to such an extent that a certain amount of such salts are thrown out of solution, whereupon the resulting concentrated solution is diluted to restore thereto an amount of water substantially equivalent to the amount removed by the evaporation. The soluble salts thrown out of the solution by the aforementioned concentration will contain a certain percentage of zinc, and, in accordance with the invention, such precipitated salts are appropriately treated to recover most of the zinc content thereof which is thereupon returned to the main operation.

The improvements contemplated by the invention will be understood from the following description taken in conjunction with the accompanying drawing wherein is represented a flow sheet of what I now consider the preferred practice in carrying out the invention.

The zinc ore, concentrate, or other appropriate zinciferous material, if not already in an oxidized condition, is first roasted in order to convert the metallic sulfides therein into oxides. Any appropriate method of roasting may be employed which will give a roasted product containing the highest percentage of zinc soluble in sulfuric acid. The calcined or roasted product is then transferred to appropriate leaching tanks where it is treated with sulfuric acid in the form of the tail solution or spent electrolyte obtained from the electrolytic cells of the system.

The leaching of the calcine is carried on until as much of the zinc content thereof as possible has been dissolved. The acidity of the resulting solution is brought to between 0.01 and 0.15% sulfuric acid by the addition of fresh calcine thereto. The solution is then separated from the residue by decantation or by filtration and is then treated with metallic zinc in order to neutralize the slight excess of acid therein as well as to precipitate part of the copper. The solution is separated from the precipitate resulting from the metallic zinc treatment by decantation or by filtration.

The solution is next made basic by the addition thereto of a small amount (about 0.1%) of a strongly basic substance, such as calcium hydrate or sodium hydrate. The solution is now ready for the removal therefrom of soluble salts in accordance with my present invention. To this end, the solution is concentrated, preferably by evaporation, to such an extent that after filtration of the precipitated basic salts and redilution as hereinafter more particularly described, no soluble salts will be present in the solution in such quantity that the solution will become saturated therewith at any other point in the cycle. The amount of evaporation necessary to accomplish this end will ordinarily vary between 5% and 20%. An oxidizing agent is preferably added to the solution either during or after the aforesaid evaporation in order to precipitate iron as ferric hydrate or sulfate together with a part of the other metallic salts contained in the solution.

The soluble salts thrown out of solution or precipitated as a result of the aforementioned evaporation and concentration of the solution are separated from the solution by a decantation or filtration operation. The residue is subjected to appropriate treatment for the recovery therefrom of any zinc therein as will be more fully described hereinafter. The resulting concentrated solution is diluted to restore thereto an amount of water substantially equivalent to the amount removed during the aforesaid evaporation. In other words, sufficient water is added to the concentrated solution to bring this solution back to substantially the same volume of the solution prior to the concentration by evaporation.

The solution is now preferably treated with zinc dust in order to effect an appropriate removal therefrom of cadmium and copper, and after appropriate filtration is passed to the electrolytic cells. In the electrolytic cells any appropriate current density may be employed, and the zinc is deposited in the metallic form at the cathodes. The spent electrolyte or tail solution from the electrolytic cells is returned to the leaching operation, thus completing the cycle of operations with respect to the main cycle solution. In the flow sheet of the accompanying drawing, the path of the cyclic solution is indicated by a relatively heavy line.

The basic residue removed from the solution (after the aforementioned concentration thereof) by filtration contains a certain amount of zinc and, in accordance with the invention, this residue is appropriately treated for the recovery of such zinc which is returned to the main cyclic solution. To this end, the basic residue is heated to a sufficient degree to dehydrate any gelatinous silica therein and to form salts of the alkali and alkaline earth metals which will be less soluble in dilute sulfuric acid than the zinc compound or compounds in the basic residue. I have found a temperature of from 100° C. to 300° C. satisfactory for this purpose.

The calcined basic residue is now leached with water or very dilute sulfuric acid (0.01 to 0.02%) in order to dissolve the zinc content thereof. This leaching operation is conducted until the concentration of zinc in the solution is approximately the same as that of the main cyclic solution prior to electrolysis. Concentration of soluble salts other than zinc in this solution must also be regulated, by evaporation and dilution, if necessary, to approximate the same condition of concentration with respect thereto in the main cyclic solution prior to its introduction into the electrolytic cells. The final solution obtained by leaching the basic residue, if free from iron, is returned to the main cyclic solution after the dilution of the latter, as hereinbefore described. If the solution from the leaching of the basic residue contains iron, it is returned to the main cyclic solution at a stage directly proceeding the addition of the strong base, as hereinbefore described.

The concentration of the zinc solution (as finally prepared for electrolysis) is preferably determined by analysis of a composite sample taken for each twenty-four hours of this solution as it goes to the electrolytic cells. The concentration of zinc in the solution before and after the elimination of soluble salts therefrom in accordance with the invention is best determined by analyzing appropriate samples of the solution before and after evaporation. If the ore or other material treated is reasonably uniform in zinc and other soluble salts, specific gravity tests may be used for rough determinations of concentration after analyses have been made on a well established cycle. As only such concentrations of the troublesome salts are carried as will keep them from saturating the solution, an occasional analysis before evaporation is the best way to determine and check such concentrations. The saturation points of the soluble salts will vary slightly with each new combination introduced into the cycle and therefore hydrometer or specific gravity tests cannot safely be used until analyses have established the economical concentrations.

The residue resulting from both of the metallic zinc treatments may be appropriately treated for the recovery of metal values therein, such as copper and cadmium.

From the foregoing description, it will be seen that the present invention provides for the elimination from the main cyclic solution of all soluble salts which are not removed by any definite chemical or electrochemical reaction, and which would normally be thrown out of solution by coming to a point of super-saturation. The soluble salts to be so eliminated from the solution will depend upon the nature of the zinc ore or other material being treated for the recovery of zinc, and as examples of such salts the sulfates of magnesium, calcium, sodium and potassium and soluble silicates may be mentioned. In accordance with the invention, the elimination of soluble salts is obtained by a separate operation, which enables most of the zinc carried out of solution with such soluble salts to be recovered in a simple and economical manner. Moreover, the improvements provided by the method of the invention produce a better condition for the subsequent treatment of the usual residues. The only addition of soluble salts to the main cyclic solution is the very small amount added prior to the concentration of the solution in accordance with the invention so that there is no substantial contamination of the main cyclic solution as the result of any purification step employed.

In the heretofore customary processes of recovering zinc electrolytically, super-saturation of the solution most usually occurs during the electrolysis of the solution in the electrolytic cells on account of the evaporation which necessarily takes place there. Zinc is electrolytically deposited at a minimum of 2.35 volts. Current passing through the zinc electrolyte at this or a higher voltage will form considerable amounts of hydrogen and oxygen gas, consequently diminishing the volume of the solution. By the improvements of the invention, the concentration of soluble salts in the cyclic solution is so adjusted and regulated prior to electrolysis as to inhibit super-saturation of the electrolyte during the electro-deposition of the zinc, and the interference heretofore experienced on account of the crystallization of salts during the deposition of zinc is by the method of the invention eliminated.

I claim:—

1. In the method of recovering zinc from zinciferous materials involving the treatment of the zinciferous material with a cyclic solvent solution and electrodeposition of zinc therefrom, regulating the concentration of soluble salts in the cyclic solution prior to the electrolysis thereof so that at no subsequent stage in its cycle will the solution become supersaturated with such soluble salts.

2. In the method of recovering zinc from zinciferous materials involving the treatment of the zinciferous material with a cyclic solvent solution and electrodeposition of zinc therefrom, concentrating the solution prior to electrolysis and removing therefrom such an amount of soluble salts that when the so concentrated solution is appropriately diluted for electrolysis the concentration of soluble salts therein will be insufficient to produce super-saturation of the solution at any subsequent stage in its cycle, and appropriately diluting the so concentrated solution for electrolysis.

3. In the method of recovering zinc from zinciferous materials involving the treatment of the zinciferous material with a cyclic solvent solution and electrodeposition of zinc therefrom, concentrating the solution by evaporation and removing a predetermined amount of soluble salts therefrom, and diluting the so-concentrated solution for electrolysis so that the concentration of soluble salts in the diluted solution will be insufficient to produce super-saturation of the solution therewith at any subsequent stage in its cycle.

4. In the method of recovering zinc from zinciferous materials by electrolyzing a solution obtained by treatment of the zinciferous material with an appropriate solvent, subjecting the resulting solution to treatment with basic material until the solution is itself basic, concentrating the solution by evaporation until a predetermined amount of soluble salts have been precipitated, removing the precipitated salts from the solution and appropriately diluting the resulting solution for electrolysis, and electrolytically depositing zinc from the so treated solution.

5. In the method of recovering zinc from zinciferous materials involving the treatment of the zinciferous material with a cyclic solvent solution and electrodeposition of zinc therefrom, subjecting the solution to treatment with basic material until the solution is itself basic, removing a predetermined amount of soluble salts from the solution by suitable evaporation of the solution, and appropriately diluting the so treated solution for the electrodeposition of zinc therefrom.

6. In the method of recovering zinc from zinciferous materials involving the treatment of the zinciferous material with a cyclic solvent solution and electrodeposition of zinc therefrom, removing soluble salts from the solution by evaporating the solution and thereby increasing the concentration of the soluble salts therein to such an extent that a certain amount of such salts are thrown out of and separated from the solution, and diluting the resulting concentrated solution to restore thereto an amount of water substantially equivalent to the amount removed by said evaporation.

7. In the method of recovering zinc from zinciferous materials involving the treatment of the zinciferous material with a cyclic solvent solution and electrodeposition of zinc therefrom, removing soluble salts from the solution by evaporating the solution and thereby increasing the concentration of the soluble salts therein to such an extent that a certain amount of such salts are thrown out of solution, separating the residue from the resulting solution, diluting the resulting solution to restore thereto an amount of water substantially equivalent to the amount removed by said evaporation, treating said residue for the recovery of zinc therefrom, and returning the zinc so recovered to the cyclic solution.

8. In the method of recovering zinc from zinciferous materials involving the treatment of the zinciferous material with a cyclic solvent solution and electrodeposition of zinc therefrom, subjecting the solution to treatment with basic material until the solution is itself basic, evaporating the solution until such an amount of soluble salts have been thrown out of solution as to inhibit the supersaturation of the solution at any subsequent stage in its cycle, separating the residue from the resulting concentrated solution, and diluting the resulting concentrated solution to restore thereto an amount of water substantially equivalent to the amount removed by said evaporation.

9. In the method of recovering zinc from zinciferous materials involving the treatment of the zinciferous material with a cyclic solvent solution and electrodeposition of zinc therefrom, treating the solution to render it basic, evaporating the solution until such an amount of soluble salts have been thrown out of solution as to inhibit the supersaturation of the solution at any subsequent stage in its cycle, separating the residue from the resulting concentrated solution, diluting the resulting concentrated solution to restore thereto an amount of water substantially equivalent to the amount removed by said evaporation, treating said residue for the recovery of zinc therefrom, and returning the zinc so recovered to the cyclic solution.

10. In the method of recovering zinc from zinciferous materials involving the treatment of the zinciferous material with a cyclic solvent solution and electrodeposition of zinc therefrom, treating the solution to render it basic, evaporating the solution until such an amount of soluble salts have been thrown out of solution as to inhibit the super-saturation of the solution at any subsequent stage in its cycle, separating the residue from the resulting concentrated solution, diluting the resulting concentrated solution to restore thereto an amount of water substantially equivalent to the amount removed by said evaporation, heating the residue to a temperature sufficiently high to render compounds therein other than zinc relatively insoluble as compared with compounds of zinc therein, treating the residue to dissolve the zinc therein, and returning the zinc recovered from the residue to the cyclic solution.

11. In the method of recovering zinc from zinciferous materials involving the treatment of the zinciferous material with a solvent solution and electrodeposition of zinc therefrom, eliminating a certain amount of soluble salts from the solution by adding thereto a strongly basic material and an oxidizing agent and evaporating the solution, separating from the solution the soluble salts thrown out, and diluting the resulting concentrated solution to restore thereto an amount of water substantially equivalent to the amount removed by the aforesaid evaporation.

12. In the method of recovering zinc from zinciferous materials involving the treatment of the zinciferous material with a solvent solution and electrodeposition of zinc therefrom, treating the solution with a strongly basic material and oxidizing agent and then concentrating the solution by evaporation whereby a certain amount of soluble salts are thrown out of solution, separating the residue from the resulting concentrated solution, diluting the resulting concentrated solution to restore thereto an amount of water substantially equivalent to the amount removed by the aforesaid evaporation, heating the residue to a temperature from 100 to 300° C., leaching the residue to recover zinc therefrom, and returning the zinc so recovered to the first mentioned solution.

In testimony whereof I affix my signature.

JOHN THAYER ELLSWORTH.